United States Patent
Park et al.

(10) Patent No.: US 9,094,190 B2
(45) Date of Patent: Jul. 28, 2015

(54) METHOD OF MANAGING KEY FOR SECURE STORAGE OF DATA AND APPARATUS THEREFOR

(71) Applicant: Samsung Electronics Co., Ltd., Suwon-Si, Gyeonggi-Do (KR)

(72) Inventors: Jae Chul Park, Seoul (KR); Yun Ho Youm, Seoul (KR); Tong Pyo Hong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 22 days.

(21) Appl. No.: 13/956,592

(22) Filed: Aug. 1, 2013

(65) Prior Publication Data

US 2014/0037093 A1 Feb. 6, 2014

(30) Foreign Application Priority Data

Aug. 6, 2012 (KR) ........................ 10-2012-0085892

(51) Int. Cl.
*G06F 21/00* (2013.01)
*H04L 9/08* (2006.01)

(52) U.S. Cl.
CPC ............ *H04L 9/0816* (2013.01); *H04L 9/0894* (2013.01)

(58) Field of Classification Search
CPC ....... H04L 9/0816; H04L 9/0894; H04L 9/08; H04L 9/0869
USPC .......................................... 380/59, 277, 228
See application file for complete search history.

(56) References Cited

U.S. PATENT DOCUMENTS

| | | | | |
|---|---|---|---|---|
| 4,888,802 A * | 12/1989 | Cooney | ......................... | 380/277 |
| 5,737,419 A * | 4/1998 | Ganesan | ....................... | 713/169 |
| 6,108,425 A * | 8/2000 | Smith et al. | ................... | 380/277 |
| 6,490,680 B1 * | 12/2002 | Scheidt et al. | ................ | 713/166 |
| 6,539,479 B1 * | 3/2003 | Wu | ............................... | 713/151 |
| 6,708,273 B1 * | 3/2004 | Ober et al. | ..................... | 713/189 |
| 7,305,567 B1 | 12/2007 | Hussain et al. | | |
| 7,392,401 B2 | 6/2008 | Kohara et al. | | |
| 7,471,792 B2 * | 12/2008 | Yamamichi et al. | ............ | 380/44 |

(Continued)

FOREIGN PATENT DOCUMENTS

| JP | 2009-032003 A | 2/2009 |
|---|---|---|
| JP | 2009-128792 A | 6/2009 |

(Continued)

OTHER PUBLICATIONS

Zhao, "Hashed Random Key Pre-distribution Scheme for Large Heterogeneous Sensor Networks", 2012, IEEE, p. 706-713.*

*Primary Examiner* — David Pearson
*Assistant Examiner* — Gregory Lane
(74) *Attorney, Agent, or Firm* — Harness, Dickey & Pierce, P.L.C.

(57) ABSTRACT

A method and apparatus for managing a key for secure storage of data. The apparatus includes a main controller configured to process a command, a cipher unit configured to encrypt a first key to form an encrypted key or encrypt data to form encrypted data based on a result of the main controller processing the command, and decrypt the encrypted key or the encrypted data based on the result of the main controller processing the command, a hash unit configured to hash the first key according to control of the main controller, a decrypted key memory configured to store the first key, and an encrypted key memory configured to store the encrypted key.

18 Claims, 15 Drawing Sheets

(56) References Cited

U.S. PATENT DOCUMENTS

| | | |
|---|---|---|
| 7,546,461 B2 | 6/2009 | Yuval et al. |
| 7,668,310 B2 | 2/2010 | Kocher et al. |
| 8,005,227 B1* | 8/2011 | Linnell et al. ................. 380/279 |
| 8,094,819 B1* | 1/2012 | Limondin et al. ............ 380/228 |
| 2003/0023847 A1* | 1/2003 | Ishibashi et al. ............. 713/169 |
| 2005/0289397 A1* | 12/2005 | Haruki et al. ................... 714/38 |
| 2008/0095375 A1* | 4/2008 | Tateoka et al. ................ 380/282 |
| 2008/0170698 A1* | 7/2008 | Candelore ..................... 380/277 |
| 2009/0060197 A1* | 3/2009 | Taylor et al. ................. 380/277 |
| 2009/0116643 A1* | 5/2009 | Hatano et al. ................... 380/59 |
| 2009/0154710 A1* | 6/2009 | Brier et al. .................... 380/286 |
| 2010/0266129 A1* | 10/2010 | Tsuchiya ...................... 380/278 |
| 2011/0170544 A1* | 7/2011 | Boora et al. .................. 370/392 |
| 2011/0191586 A1* | 8/2011 | Jung et al. .................... 713/168 |
| 2013/0051559 A1* | 2/2013 | Baba ............................ 380/279 |

FOREIGN PATENT DOCUMENTS

| | | |
|---|---|---|
| KR | 10-0954841 B1 | 4/2010 |
| KR | 10-0992184 B1 | 11/2010 |

\* cited by examiner

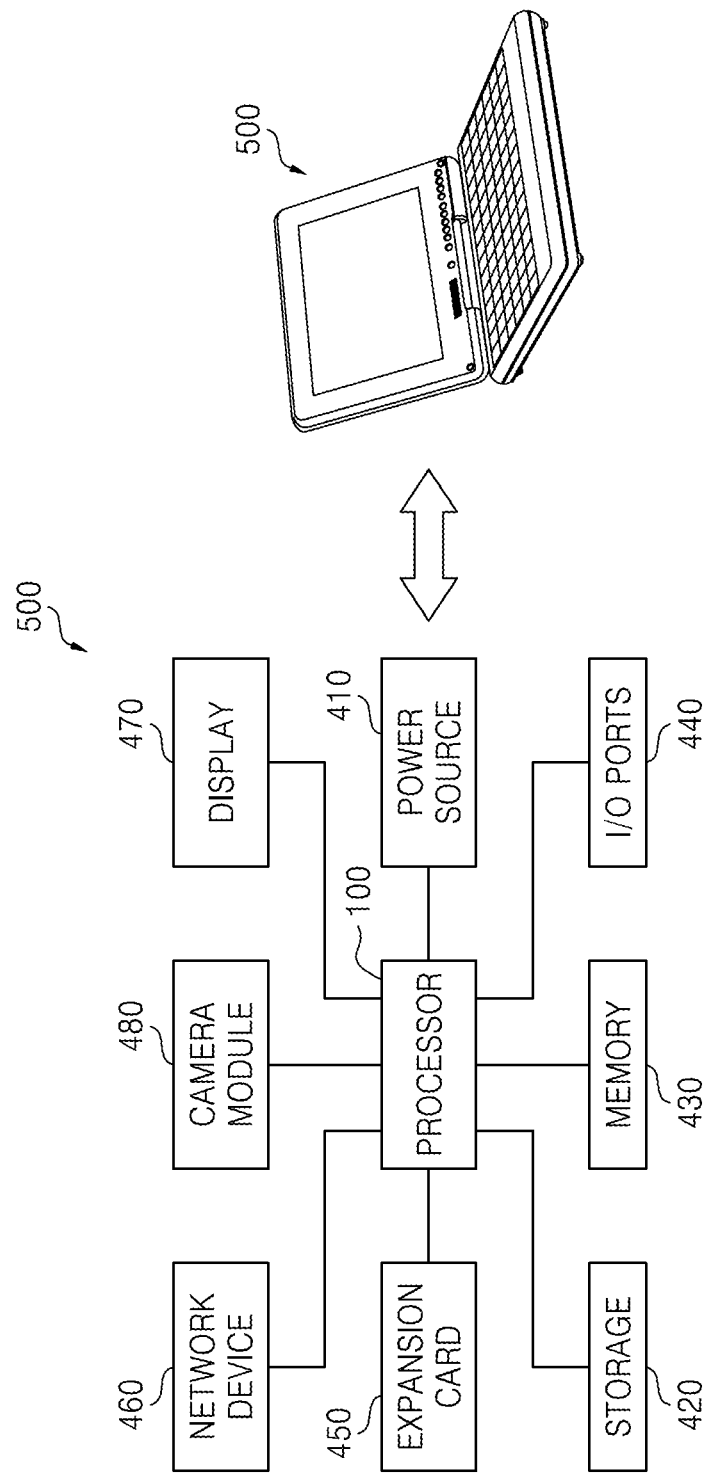

METHOD OF MANAGING KEY FOR SECURE STORAGE OF DATA AND APPARATUS THEREFOR

CROSS-REFERENCE TO RELATED APPLICATIONS

This application claims priority under 35 U.S.C. §119(a) from Korean Patent Application No. 10-2012-0085892 filed on Aug. 6, 2012, the disclosure of which is hereby incorporated by reference in its entirety.

BACKGROUND

Example embodiments of the inventive concepts relate to a data storage method and apparatus.

With the diversification of applications executed in mobile devices, convenience has increased, but the frequency of processing important data (such as financial data, keys, certificates, international mobile equipment identity (IMEI), and SimLock) has also increased and attack techniques threatening the security of the data has been being developed. Therefore, it may be important to utilize crypto graphic techniques on important data to provide secure storage. The secure storage feature is a technique for securely storing and decrypting important data. According to the secure storage feature, data is securely stored and managed at the request of an application processing the data and only the application is permitted to access the data.

The secure storage feature may utilize cryptographic techniques to protect data from applications that do not have data access right or malicious software (i.e., malware or virus). The secure storage feature may further utilize techniques for securely managing a key used in the cryptographic techniques.

SUMMARY

At least one example embodiment relates to a key manager.

In one embodiment, the key manager includes a main controller configured to process a command; a cipher unit configured to, encrypt a first key to form an encrypted key or encrypt data to form encrypted data based on a result of the main controller processing the command, and decrypt the encrypted key or the encrypted data based on the result of the main controller processing the command; a hash unit configured to hash the first key according to control of the main controller; a decrypted key memory configured to store the decrypted key; and an encrypted key memory configured to store the encrypted key.

In one embodiment, the main controller includes a register configured to store the command; and a processor configured to switch between a number of states within a finite state machine based on the command.

In one embodiment, the register includes a command register configured to store the command; and a status register configured to store status information associated with the command.

In one embodiment, the command includes a command type and an address, the address being an address of one of the decrypted key in the decrypted key memory and the encrypted key in the encrypted key memory.

In one embodiment, the command includes one of a key generation command, a key encryption command, a key decryption command, a key load command, and a key destruction command.

In one embodiment, the first key is a key encryption key (KEK) configured to encrypt keys.

In one embodiment, the key manager further includes a one-time programmable (OTP) memory configured to generate the KEK; and a random number generator configured to generate a data encryption key (DEK), the DEK configured to encrypt data.

In one embodiment, the encrypted key includes a first encrypted key part, a second encrypted key part and a hash value, the first encrypted key part including a first part of the first key and a first part of a random number generated by the random number generator and the second encrypted key part including a second part of the first key and a second part of the random number.

In one embodiment, the cipher unit includes a key register configured to store the encrypted key; an input data register configured to store data; and an output data register configured to store one or more of encrypted data and decrypted data.

In one embodiment, the key manager further includes a debug mode module configured to allow a host to access the key register, the input data register and the output data register during a test mode.

In one embodiment, the debug mode module includes a debug mode register including a test mode enable bit, a random number enable bit, and reserved bits; and a debug mode enable logic unit configured to enable the test mode in response to the test mode enable bit and the random number enable bit.

In one embodiment, the cipher unit, the hash unit, the decrypted key memory, and the encrypted key memory are implemented in hardware.

In one embodiment, the main controller is configured to allow a host to read the encrypted key stored in the encrypted key memory and prevent the host from accessing the decrypted key memory, the cipher unit, and the hash unit.

At least one example embodiment relates to a method of managing a first key.

In one embodiment, the method includes processing a command stored in a command register; generating a first random number using a random number generator and storing the generated first random number as a decrypted key in a decrypted key memory, if the command is a key generation command; and generating an encrypted key, if the command is a key encryption command. The generating the encrypted key including, encrypting a hashed portion of the first key and the decrypted key to form an encrypted key, storing the encrypted key in an encrypted key memory, and reading and outputting the encrypted key from the encrypted key memory.

In one embodiment, the command includes a command type and an address of one of the encrypted key and decrypted key.

In one embodiment, the generating the encrypted key includes reading the decrypted key from the decrypted key memory; generating a hash value by mixing the decrypted key with a second random number generated by the random number generator; generating the encrypted key by performing encryption on the decrypted key, the second random number, and the hash value; and storing the encrypted key in the encrypted key memory.

At least one example embodiment relates to a key manager.

In one embodiment, the key manager includes a random number generator configured to generate a random number; a memory configured to store a first key; and a main controller configured to, store the random number in an address of a decrypted key memory, encrypt the first key based on a hashed portion of the random number and the first key to form an encrypted key and store the encrypted key in an encrypted key memory, decrypt an encrypted key received from an external host to form a decrypted key, and control communication with the external host such that, in a normal operation mode, the external host is allowed access to the encrypted key memory and is prevented from accessing the decrypted key memory.

BRIEF DESCRIPTION OF THE DRAWINGS

The above and other features and advantages of the inventive concepts will become more apparent by describing in detail exemplary embodiments thereof with reference to the attached drawings in which:

FIG. 15 is a block diagram of a data processing system according to other embodiments of the inventive concepts.

DETAILED DESCRIPTION OF THE EMBODIMENTS

Figure 1:
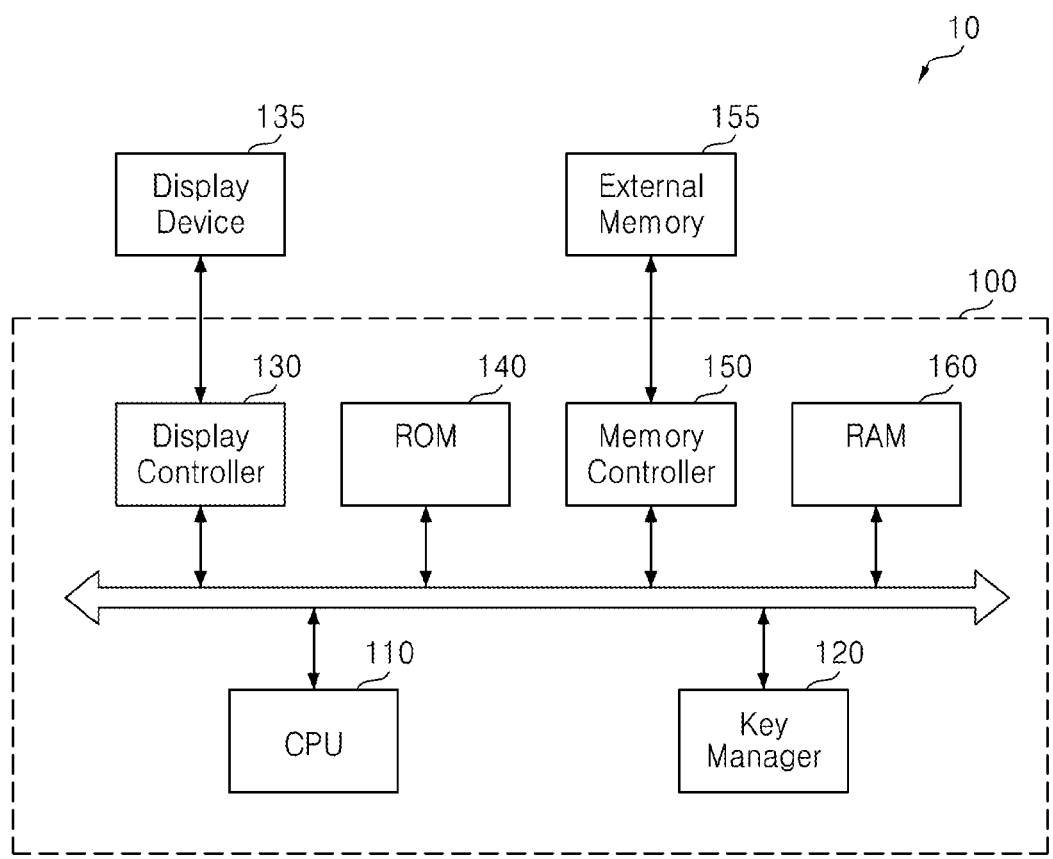
FIG. 1 is a functional block diagram of a data processing system according to some example embodiments of the inventive concepts.

The inventive concepts are described hereinafter with reference to the accompanying drawings, in which example embodiments are shown. These example embodiments may, however, be embodied in many different forms and should not be construed as limited to the example embodiments set forth herein. Rather, these example embodiments are provided so that this disclosure will be thorough and complete, and will fully convey the embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a functional block diagram of a data processing system 10 according to some example embodiments of the inventive concepts.

As illustrated in FIG. 1, the data processing system 10 may include a system on chip (SOC) 100, a display device 135, and an external memory device 155. The data processing system 10 may be a mobile device, a smart phone, a personal digital assistant (PDA), a personal computer (PC), a tablet PC, a notebook, a net-book, an e-reader, a portable multimedia player (PMP), an MP3 player, or an MP4 player but is not restricted thereto.

The SOC 100 may be an application processor. The application processor may control the overall operation of the data processing system 10. The SOC 100 may include a central processing unit (CPU) 110, a key manager 120, a display controller 130, a read-only memory (ROM) 140, a random access memory (RAM) 160, a memory controller 150, and a bus. The SOC 100 may also include other elements such as a power management unit, a television (TV) processor, a graphics processing unit (GPU), and a clock unit.

The CPU 110 may process or execute programs and/or data that are stored in the memory 140, 160, or 155 according to, for example, an operating clock frequency. The CPU 110 may be implemented as a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform multi-acceleration.

The key manager 120 manages keys used for encryption, and encrypts and decrypts data and the keys. Secure storage is a technique for permitting only authorized users or programs to access important data. For the secure storage, data is encrypted and securely stored in memory and then decrypted when it is used so that the data is protected from illegal users or programs. Decisions about illegal access depend on whether the access has permission to use a key for encryption.

The key manager 120 protects a key from a key sniffing attack and a key corruption attack. The key sniffing attack is an illegal access to a key and the key corruption attack is damaging or destroying a key. Accordingly, in order to securely manage a key, the key manager 120 blocks these illegal accesses to the key and can confirm the integrity of the key.

The key manager 120 provides a key management function. The key management function relates to management of the entire life cycle of a key including the creation, use, storage, decryption, and destruction of the key. The key management function includes encrypting and storing a key in non-volatile memory in preparation for possible power off and decrypting the key when necessary. It also includes key encryption, key hashing, and access control prohibiting a host (e.g., software or an application executed in the host) from accessing a key.

According to some example embodiments of the inventive concepts, a host can operate the key manager 120 only through a command and software is not permitted to access a key.

The programs and/or the data stored in the external memory device 155 may be loaded to a memory or the CPU 110 within the SOC 100 when necessary.

The ROM 140 may store permanent programs and/or data. The ROM 140 may be implemented by erasable programmable ROM (EPROM) or electrically erasable programmable ROM (EEPROM).

The RAM 160 may temporarily store programs, data, or instructions. The programs and/or data stored in the ROM 140 may be temporarily stored in the RAM 160 according to the control of the CPU 110 or a booting code stored in the ROM 140. The RAM 160 may be implemented by dynamic RAM (DRAM) or static RAM (SRAM).

The memory controller 150 is used for interface with the external memory device 155. The memory controller 150 controls the overall operation of the external memory device 155 and controls the data communication between a host and the external memory device 155. The memory controller 150 may control the external memory device 155 to write or read data at the request of the host. The host may be a master device such as the CPU 110 or the display controller 130.

The external memory device 155 is a storage device for storing data and may store an operating system (OS) and various kinds of programs and data. The external memory device 155 may be implemented by volatile memory such as DRAM or non-volatile memory such as flash memory, phase-change RAM (PRAM), magneto-resistive RAM (MRAM), resistive RAM (ReRAM), or ferroelectric RAM (FeRAM). In other embodiments, the external memory device 155 may be embedded in the SOC 100.

The elements 110 through 160 may communicate with one another through the bus.

The display device 135 may display multimedia data. The display device 135 may be a liquid crystal display (LCD) device, but the inventive concepts are not restricted thereto. In other example embodiments, the display device 135 may be a light emitting diode (LED) display device, an organic LED (OLED) display device, or one of other types of display devices. The display controller 130 controls the operations of the display device 135.

Figure 2:
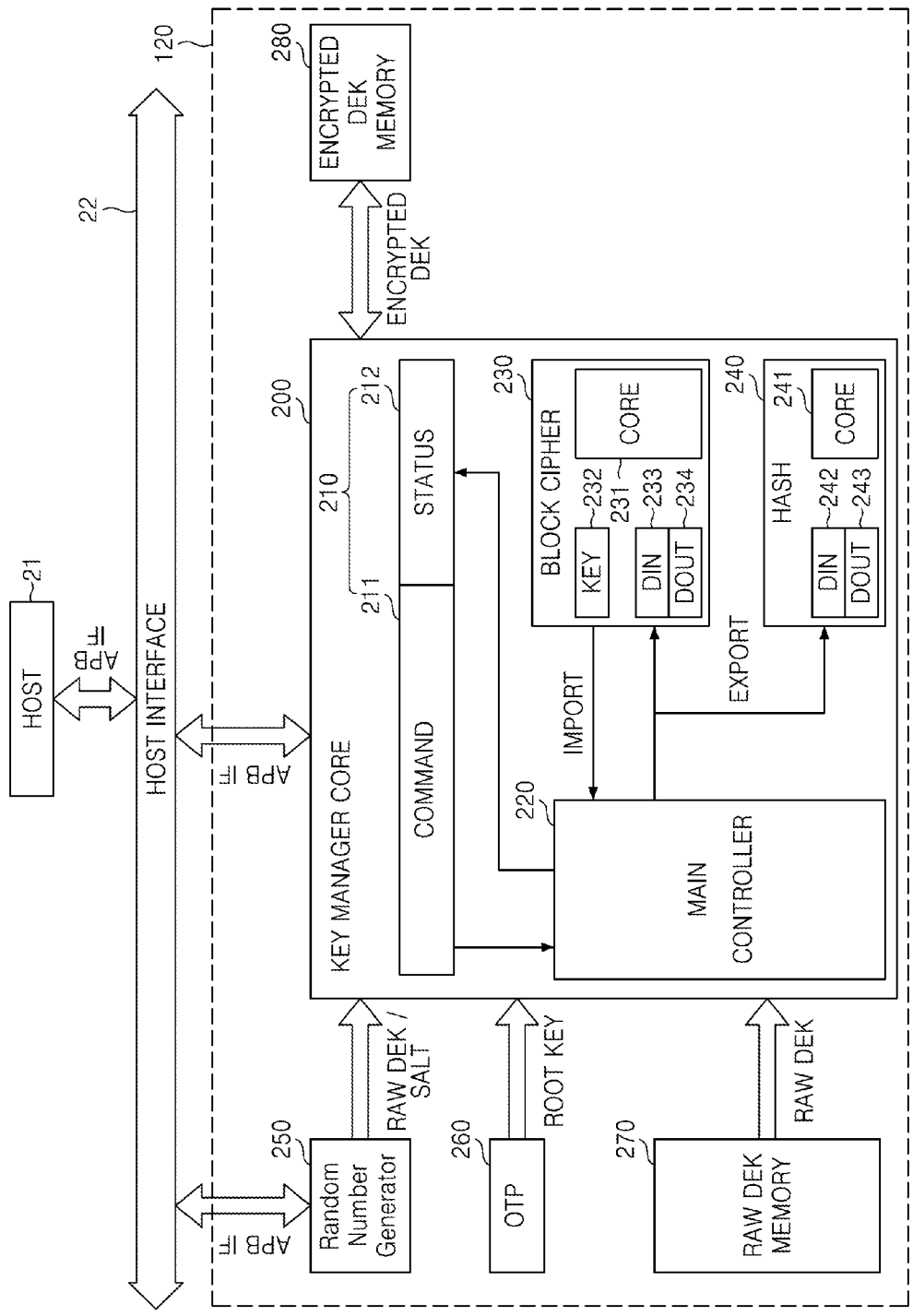
FIG. 2 is a detailed block diagram of a key manager illustrated in FIG. 1.

FIG. 2 is a detailed block diagram of the key manager 120 illustrated in FIG. 1.

Referring to FIG. 2, the key manager 120 includes a key manager core 200, a key generator, and a key memory.

The key manager core 200 includes a register 210, a main controller 220, a block cipher unit 230, and a hash unit 240.

The key generator includes a random number generator 250 and a one-time programmable (OTP) memory 260. Although the OTP memory 260 is illustrated within the key manager 120, the OTP memory 260 may be provided outside the key manager 120 in other example embodiments.

The key memory includes an encrypted key memory 280 storing an encrypted key and a decrypted key memory 270 storing a key that has not been encrypted.

The key manager core 200 may be implemented in hardware. The block cipher unit 230, the hash unit 240, and the memories 270 and 280 may also be implemented by hardware modules, but the inventive concepts are not restricted thereto.

The key manager core 200 supports block ciphers having various key sizes and provides a key generate function, key encrypt function, key decrypt function, key load function, and key destroy function in response to different commands.

The register 210 includes a command register 211 and a status register 212. The command register 211 stores a command received from a host 21. The status register 212 stores a result of executing the command of the host 21. Data of the status register 212 is reported to the host 21 using an interrupt or polling method.

The main controller 220 interprets and executes the command from the host 21. The main controller 220 may be implemented by a finite state machine (FSM).

The block cipher unit 230 may encrypt or decrypt (or restore) data and a key according to control of the main controller. The block cipher unit 230 may receive a key used to encrypt data (hereinafter, referred to as a "data encryption key (DEK)") from the random number generator 250 in the key generator. The random number generator 250 may be implemented by a hardware random number generator (HRNG), a true random number generator (TRNG) or a pseudo random number generator (PRNG). The block cipher unit 230 may receive a key used to encrypt a key (hereinafter, referred to as a "key encryption key (KEK)") from the OTP memory 260. The block cipher unit 230 may include a core logic 231, a key register 232, an input data register 233, and an output data register 234.

The core logic 231 is a logic performing encryption and decryption. The key register 232 temporarily stores a key for encryption or decryption of a key, i.e., KEK or a key for encryption or decryption of data, i.e., DEK. The input data register 233 temporarily stores key or data to be encrypted or decrypted. The output data register 234 temporarily stores encrypted or decrypted key or data.

Encryption of the same keys results in the same ciphers. Accordingly, when the encrypted key is stored in external memory, the sameness of keys can be checked even though the real values of the keys are not known. To prevent sniffing for the key from happening, a random number is mixed with a key during the encryption to randomize the encrypted key. The random number may be generated by the random number generator 250.

The hash unit 240 hashes a key according to control of the main controller. A hash algorithm of the hash unit 240 is a function of converting an input value with random length into an output value with fixed length. Here, the output value is a hash value. The operation of the hash unit 240 will be described later.

The decrypted key memory 270 stores a raw key generated from the random number generator 250, i.e., a key that has not been encrypted or a decrypted key. The encrypted key memory 280 stores a key encrypted to be transmitted to an outside.

The key manager 120 interfaces with the host 21 through a host interface 22. The host interface 22 transfers commands, status, and keys between the host 21 and the key manager 120. The host interface 22 may be an advanced microcontroller bus architecture (AMBA) high-performance bus (AHB) slave interface, but example embodiments are not restricted thereto.

Keys used in the key manager 120 are divided into encrypted keys and decrypted keys. The decrypted keys are keys that have not been encrypted. The decrypted keys are used only within the key manager 120 and cannot be accessed by the host 21. The encrypted keys are keys that have been encrypted to be sent out for the storage of decrypted keys. A random number and a hash value of a key are used in encrypting the key to randomize the key.

Figure 3:
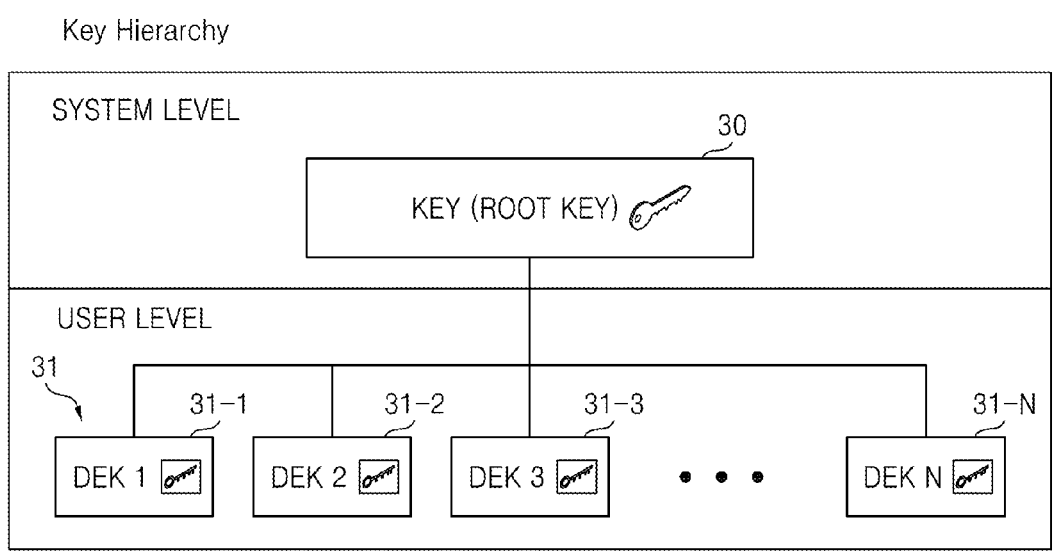
FIG. 3 is a diagram of the hierarchical structure of keys.

FIG. 3 is a diagram of the hierarchical structure of keys.

Referring to FIG. 3, there are two kinds of keys: one is a key encryption key KEK 30 used in a system level; the other is a data encryption key DEK 31 used in a user level. The KEK is a key used to encrypt a key and is also referred to as a root key. The KEK is provided from outside the core 200 (e.g., from the OTP memory 260). DEKs 31-1 through 31-N are used to encrypt data. The DEKs 31-1 to 31-N are generated by the random number generator (e.g., TRNG or PRNG) 250 and stored in the decrypted key memory 270.

Figure 4:
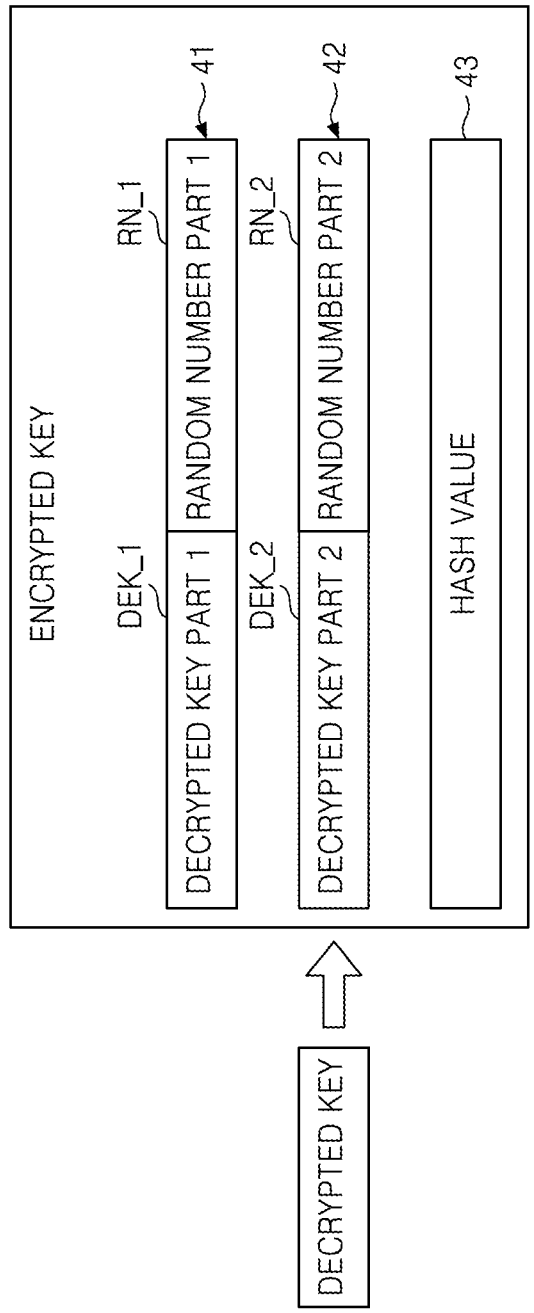
FIG. 4 is a diagram of the process of generating an encrypted key from a decrypted key according to some example embodiments of the inventive concepts.

FIG. 4 is a diagram of the process of generating an encrypted key from a decrypted key according to some example embodiments of the inventive concepts.

Referring to FIG. 4, the decrypted key may be divided into two parts: a first decrypted key part DEK__1 and a second decrypted key part DEK__2. A random number generated by the random number generator 250 may also divided into two parts: a first random number part RN__1 and a second random number part RN__2.

The first decrypted key part DEK__1 and the first random number part RN__1 are combined into a first encrypted key part 41. In other words, the first encrypted key part 41 is composed of the first decrypted key part DEK__1 and the first random number part RN__1. The second decrypted key part DEK__2 and the second random number part RN__2 are combined into a second encrypted key part 42. In other words, the second encrypted key part 42 is composed of the second decrypted key part DEK__2 and the second random number part RN__2.

The decrypted key may be composed of M bits where M is an integer of at least 2. The random number generated by the random number generator 250 may also be composed of M bits, but it is not necessary that the number of bits in the decrypted key is the same as the number of bits in the random number.

A part (e.g., upper bits) of the decrypted key may correspond to the first decrypted key part DEK__1 and the remaining part (e.g., lower bits) of the decrypted key may correspond to the second decrypted key part DEK__2, but the inventive concepts are not restricted thereto. A part (e.g., upper bits) of the random number generated by the random number generator 250 may correspond to the first random number part RN__1 and another part (e.g., middle bits) of the random number may correspond to the second random number part RN__2, but the inventive concepts are not restricted thereto.

The encrypted key includes the first encrypted key part 41, the second encrypted key part 42, and a hash value 43. A process of generating a decrypted key from an encrypted key, i.e., a decryption process is opposite to the encryption process described above.

Figure 5:
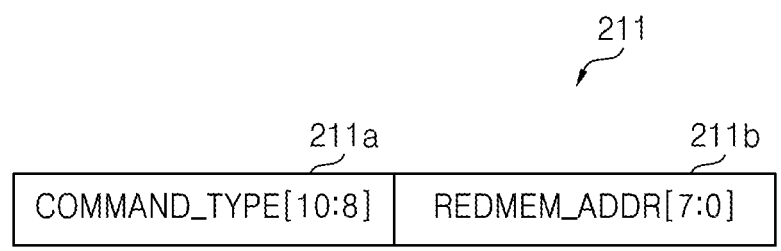
FIG. 5 is a diagram of a command register illustrated in FIG. 2 according to some embodiments of the inventive concepts.

FIG. 5 is a diagram of the command register 211 illustrated in FIG. 2 according to some embodiments of the inventive concepts. Referring to FIG. 5, a command includes a command type 211aCOMMAND_TYPE and a decrypted key address 22bREDMEM_ADDR. Accordingly, the command register 211 has a structure for storing the command type COMMAND_TYPE and the decrypted key address REDMEM_ADDR.

The command type COMMAND_TYPE may be a number indicating which one of a plurality of key commands is desired. That is, the command type COMMAND_TYPE may be data indicating which one of the plurality of key commands is desired. The decrypted key address REDMEM_ADDR is a target address of a decrypted key.

The key commands may include a key generation command, a key encryption command, a key decryption command, a key load command, and a key destruction command. These key commands may be predefined or predetermined.

FIGS. 6 through 10 are flowcharts of the operations of processing respective commands in response to the commands. The operations illustrated in FIGS. 6 through 10 may be executed by the data processing system 10.

Figure 6:
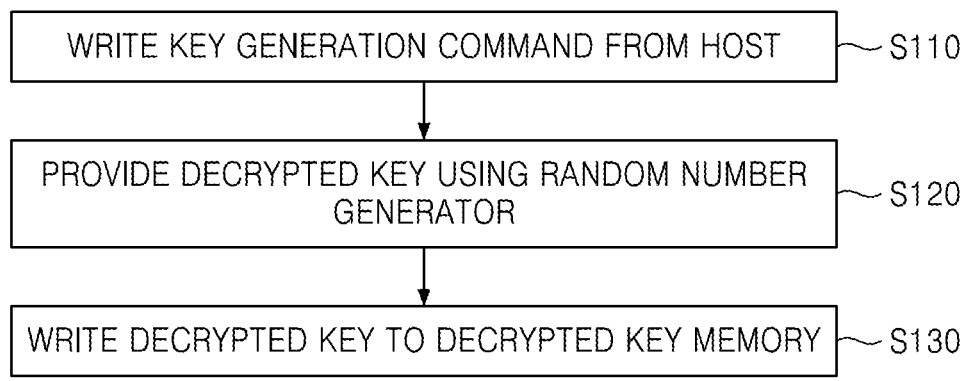
FIG. 6 is a diagram of the processing flow of a key generation command.

FIG. 6 is a diagram of the processing flow of a key generation command.

As illustrated in FIG. 6, the host 21 writes the key generation command to the command register 211 in operation S110. For instance, the host 21 may write a command type and a decrypted key address, which correspond to the key generation command, to the command register 211. Once the key generation command is written to the command register 211, the main controller 220 interprets and executes the command from the command register 211.

In detail, the main controller 220 receives a decrypted key from the random number generator 250 in operation S120. The decrypted key is a random number generated by the random number generator 250. Thereafter, the main controller 220 writes the decrypted key to the decrypted key address in the decrypted key memory 270 in operation S130.

Figure 7:
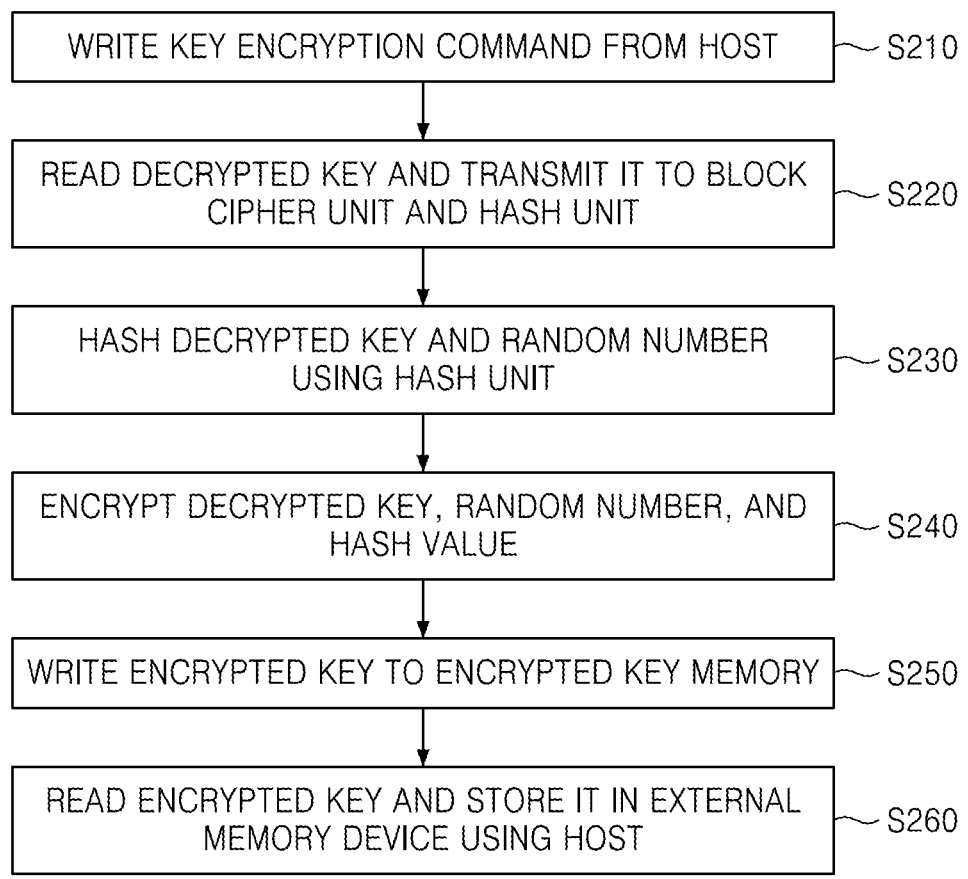
FIG. 7 is a diagram of the processing flow of a key encryption command.

FIG. 7 is a diagram of the processing flow of a key encryption command.

As illustrated in FIG. 7, the host 21 writes the key encryption command to the command register 211 in operation S210. For instance, the host 21 may write a command type and an address, which correspond to the key encryption command, to the command register 211. Once the key encryption command is written to the command register 211, the main controller 220 interprets and executes the command from the command register 211.

The main controller 220 reads a decrypted key from the address in the decrypted key memory 270 and transmits the decrypted key to the block cipher unit 230 and the hash unit 240 in operation S220. The hash unit 240 mixes the decrypted key with a random number received from the random number generator 250 to generate a hash value in operation S230. The hash unit 240 transmits the hash value to the block cipher unit 230. The block cipher unit 230 encrypts the decrypted key, the random number, and the hash value using a KEK in operation S240. The KEK may be provided from the OTP memory 260. The encrypted key generated is stored in the encrypted key memory 280 in operation S250. The host 21 reads the encrypted key from the encrypted key memory 280 and stores it in the external memory device 155 in operation S260.

Figure 8:
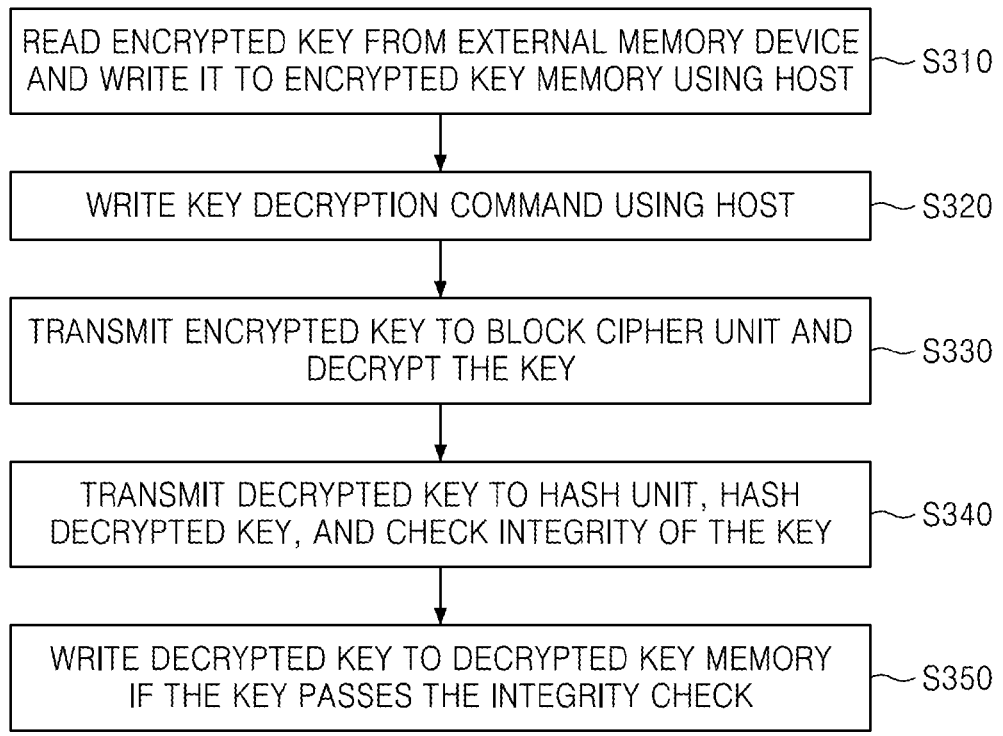
FIG. 8 is a diagram of the processing flow of a key decryption command.

FIG. 8 is a diagram of the processing flow of a key decryption command.

As illustrated in FIG. 8, the host 21 reads an encrypted key from the external memory device 155 and writes it to the encrypted key memory 280 through the host interface 22 in operation S310 and then writes the key decryption command to the command register 211 in operation S320. At this time, the host 21 may write a command type and an address, which correspond to the key decryption command, to the command register 211. Once the key decryption command is written to the command register 211, the main controller 220 interprets and executes the command from the command register 211.

The main controller 220 reads the encrypted key from the encrypted key memory 280 and transmits it to the block cipher unit 230 and the block cipher unit 230 generates a decrypted key from the encrypted key through a process opposite to the above-described encryption process in operation S330. The decrypted key is transmitted to the hash unit 240 and the hash unit 240 generates a hash value using the decrypted key and compares the hash value with a hash value in the encrypted key to check the integrity of the key in operation S340. If the decrypted key passes the integrity check, it is written to its corresponding address in the decrypted key memory 270 in operation S350.

Figure 9:
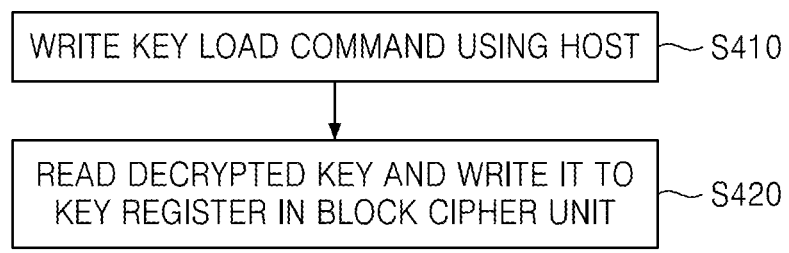
FIG. 9 is a diagram of the processing flow of a key load command.

FIG. 9 is a diagram of the processing flow of a key load command. The key load command is for encrypting data. The host 21 writes the key load command to the command register 211 in operation S410. In detail, the host 21 may write a command type and an address, which correspond to the key load command, to the command register 211. Once the key load command is written to the command register 211, the main controller interprets and executes the command from the command register 211. In detail, the main controller 220 reads a decrypted key from the address in the decrypted key memory 270 and writes it to the key register 232 in the block cipher unit 230 in operation S420.

Figure 10:
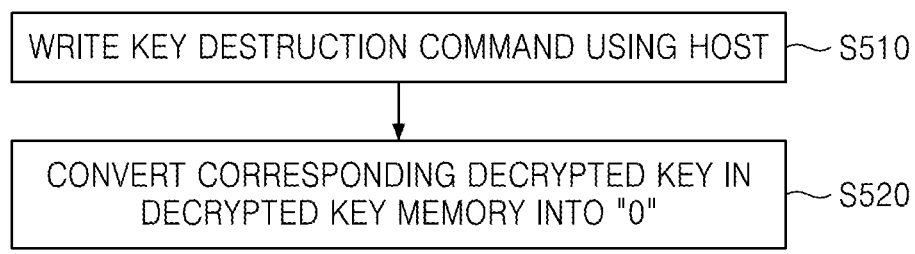
FIG. 10 is a diagram of the processing flow of a key destruction command.

FIG. 10 is a diagram of the processing flow of a key destruction command. The key destruction command is for destroying a key. The host 21 writes the key destruction command to the command register 211 in operation S510. In detail, the host 21 may write a command type and an address, which correspond to the key destruction command, to the command register 211. Once the key destruction command is written to the command register 211, the main controller interprets and executes the command from the command register 211. In detail, the main controller 220 converts a key from stored at the address in the decrypted key memory 270 to "0" in operation 5520.

The status register 212 reports a result (e.g., one of four results) of executing the command to the host 21 using the interrupt or polling method. For instance, the main controller 220 writes a command execution result such as completion of command execution or fail of command execution, to the status register 212 during the execution of the command. At this time, the status written to the status register 212 may be reported to the host 21 using interrupt or may be periodically read by the host 21.

Figure 11:
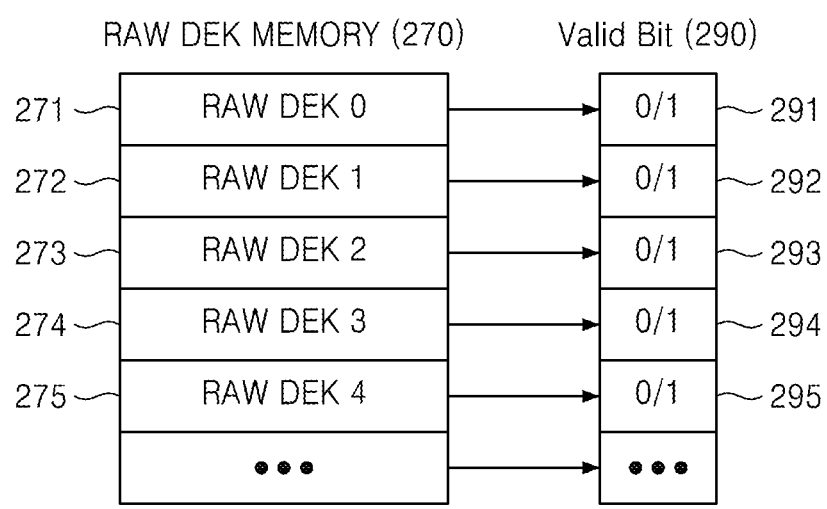
FIG. 11 is a diagram of valid bits corresponding to decrypted key entries stored in a decrypted key memory.

FIG. 11 is a diagram of valid bits corresponding to decrypted key entries stored in the decrypted key memory (or the raw DEK memory) 270. Referring to FIG. 11, the key manager 120 manages valid bits respectively corresponding to decrypted key entries stored in the decrypted key memory 270.

A valid bit may be composed of a single bit and may have a value of "1" or "0". The valid bit may be set to "1" only for a decrypted key entry generated by the key generation command or the key decryption command. This is because when there is no valid bit in the decrypted key memory 270 reset to a value of "0", a valid key (or a random key) cannot be distinguished from a key having all values of "0". When a decrypted key entry for which a value bit is not set to "1" is accessed, command fail is reported to the host 21. When a key whose values are all "0' is used, it means that a value known to the host 21 is used as a DEK, which weakens security.

The main controller 220 may set a valid bit to "1" only when a decrypted key entry stored in the decrypted key memory 270 is generated by the key generation command or the key decryption command. The main controller 220 may check whether the decrypted key entry in the decrypted key memory 270 is a zero key and may set the corresponding valid bit to "0" when the decrypted key entry is the zero key. The zero key is a key whose bits are all "0". The default value of a valid bit may be "0".

According to some example embodiments, keys and data may be set by the host 21 through the host interface 21, in other example embodiments keys and data may be set by the key manager 120 in response to a command received from a host, and these keys and data may be restricted from being accessed by the host 21 for security. A finite state machine (FSM) may be used to prevent the host 21 from accessing data or clearing the data in certain states and control the accessing or the clearing of the data in other states.

Figure 12:
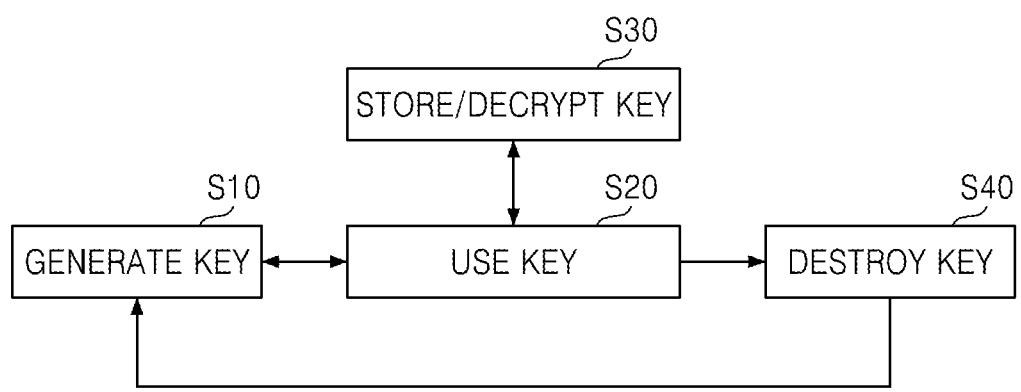
FIG. 12 is a diagram of the life cycle of a key.
Figure 13:
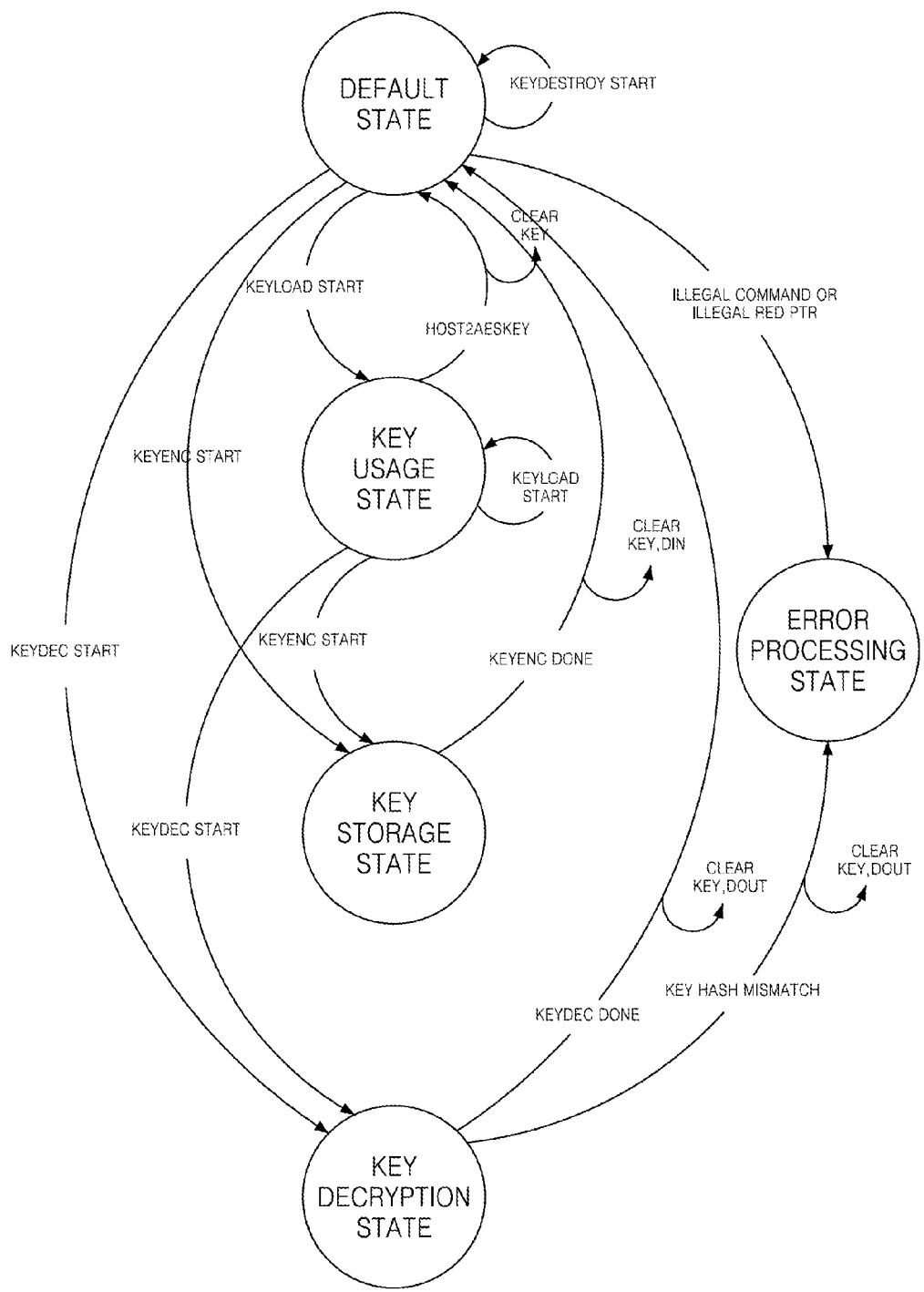
FIG. 13 is a transition diagram of the finite state machine of a key manager according to some embodiments of the inventive concepts.

FIG. 12 is a diagram of the life cycle of a key. FIG. 13 is a transition diagram of the FSM of the key manager 120 according to some example embodiments of the inventive concepts.

Referring to FIG. 12, the key is generated in stage S10, is used in stage S20, is stored and decrypted in stage S30, and is destroyed in stage S40.

Referring to FIG. 13, the FSM of the key manager 120 may have five states, i.e., a default state, a usage state, a storage state, a decrypted state, and an error processing state.

In the default state, keys and data are not protected. When a key is loaded in response to the key load command in the default state, transition to the usage state is made.

In the usage state, the key is loaded to the key register 232 of the block cipher unit 230 and is used to encrypt data. In the usage state, the key register 232 to which the key has been loaded is protected. In other words, the access of the host 21 to the key register 232 is blocked.

When key encryption starts in response to the key encryption command in the default state or the usage state, transition to the storage state is made. In the storage state, the key encryption command is processed. In this state, the key register 232 and the input data register 233 are protected. In other words, the access of the host 21 to the key register 232 and the input data register 233 is blocked. At this time, the host 21 may access and read encrypted data written to the output data register 234. When the key encryption is completed, transition from the storage state to the default state is made. During the transition, the key register 232 and the input data register 233 are initialized. In other words, values are cleared from the key register 232 and the input data register 233.

When key decryption starts in response to the key decryption command in the default state or the usage state, transition to the decryption state is made. In the decryption state, the key decryption command is processed. In this state, the key register 232 and the output data register 234 are protected. In other words, the access of the host 21 to the key register 232 and the output data register 234 is blocked. When the key decryption is completed, transition from the decryption state to the default state is made. During the transition, the key register 232 and the output data register 234 are initialized. In other words, values are cleared from the key register 232 and the output data register 234.

In the error processing state, errors are processed. When an abnormal command is input in the default state, transition to the error processing state is made. When key hash mismatch occurs in the decryption state, transition to the error processing state is made. At this time, the key register 232 and the output data register 234 are initialized. The key hash mismatch means that a hash value generated by the hash unit 240 is different from a hash value in an encrypted key.

The key manager 120 may support a debug mode to provide the convenience of debugging. The main memory of the key manager 120 is not allowed to be accessed by the host 21 during the execution of certain commands for security. Therefore, there may be difficulties in debugging in a field programmable gate array (FPGA) or chip test. To solve this problem, the host 21 may be allowed to access main registers of the key manager 120 during the debug mode.

For instance, the host 21 may be allowed to access and read data from a valid bit register, the input data register 233, the output data register 234, the key register 232, and the hash output register 243 during the debug mode. Also, the host 21 may be allowed to read data from the random number register and the decrypted key memory 270 and to write a value set by a user to the random number register and the decrypted key memory 270 so that a test can be done using the value wanted by the user.

Figure 14:
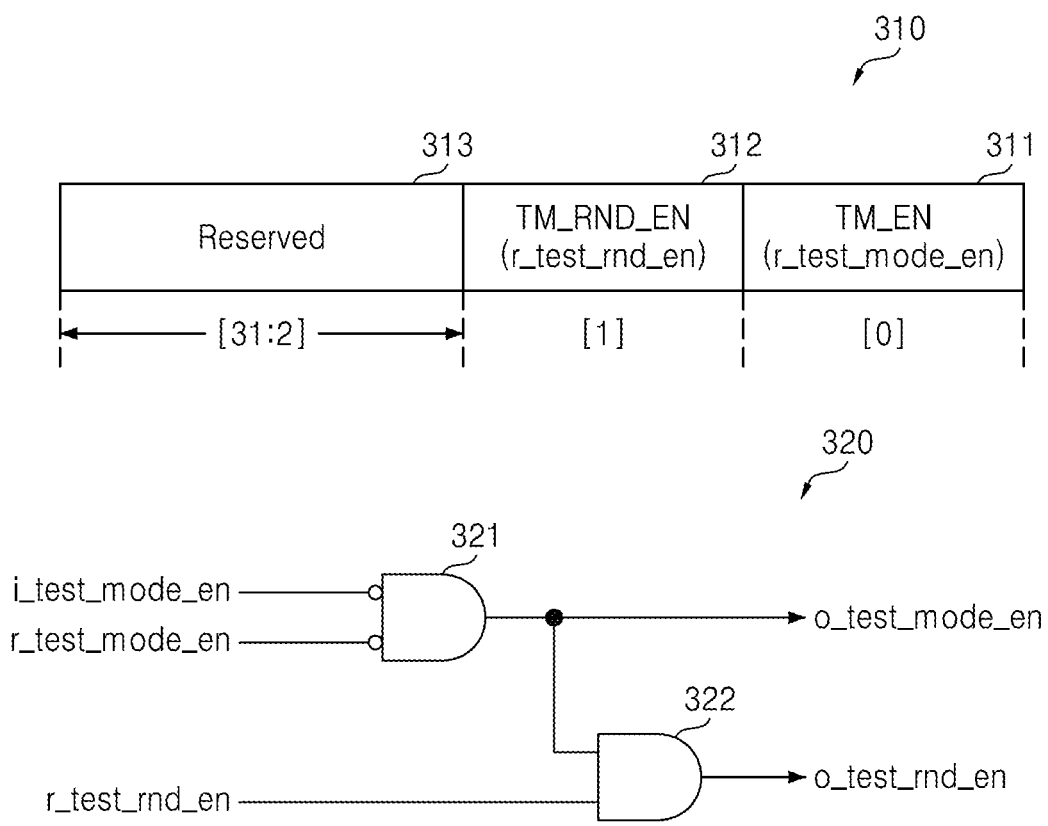
FIG. 14 is a block diagram of a debug mode module according to some embodiments of the inventive concepts.

FIG. 14 is a block diagram of a debug mode module 310 according to some example embodiments of the inventive concepts. The debug mode module 310 is a circuit enabling the debug mode.

Referring to FIG. 14, the debug mode module 310 includes a debug mode enable logic unit 320 and a test mode register. The debug mode module 310 may be included within the key manager 120.

The test mode register may be a 32-bit register. It may include a test mode enable bit r_test_mode_en, a random number enable bit r_test_rnd_en, and reserved bits.

The debug mode enable logic unit 320 may include a first AND element 321 and a second AND element 322. The first AND element 321 performs an AND operation on values obtained by inverting an OTP bit i_test_mode_en generated from the OTP memory 260 and the test mode enable bit r_test_mode_en. The second AND element 322 performs an AND operation on an output o_test_mode_en of the first AND element 321 and the random number enable bit r_test_rnd_en and generates an output o_test_rnd_en.

The test mode enable bit r_test_mode_en may have an initial value of "0" and may be written only once. Debug mode enabling is determined by the OTP bit i_test_mode_en and the test mode enable bit r_test_mode_en. When both of the bits are "0", the output o_test_mode_en of the first AND element 321 is "1" enabling the debug mode. Therefore, the debug mode is continued while both the OTP bit i_test_mode_en and the test mode enable bit r_test_mode_en are "0" (i.e., active low). When the OTP bit i_test_mode_en is set to "1" or a value of "1" is written to the test mode enable bit r_test_mode_en, the debug mode may be terminated.

The random number enable bit r_test_rnd_en allows a user's random number to be written to the random number register during the debug mode. When the random number enable bit r_test_rnd_en is "1" in the debug mode, the output o_test_rnd_en of the second AND element 322 is "1" enabling the debug mode. Therefore, when the random number enable bit r_test_rnd_en is "1", a random number designated by a user can be written to the random number register and tested.

FIG. 15 is a block diagram of a data processing system 500 according to other embodiments of the inventive concepts.

Referring to FIG. 15, the data processing system 500 may be implemented as a personal computer (PC), a notebook, a laptop computer or a data server. The data processing system 500 may also be implemented as a portable device. The portable device may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

The data processing system 500 includes the processor 100, a power source 410, a storage 420, a memory 430, I/O ports 440, an expansion card 450, a network device 460, and a display 470. The data processing system 500 may further include a camera module 480.

The processor 100 may be the system-on-chip (SoC) illustrated in FIG. 1. The processor 100 may be a multi-core processor.

The processor 100 may control the operation of at least one of the elements 100, and 410 through 480. The power source 410 may supply an operating voltage to at least one of the elements 100, and 410 through 480. The storage 420 may be implemented by a hard disk drive (HDD) or a solid state drive (SSD).

The memory 430 may be implemented by a volatile or non-volatile memory and it may correspond to the memory device 155 illustrated in FIG. 1.

A memory controller (not shown) that controls a data access operation, e.g., a read operation, a write operation (or a program operation), or an erase operation, on the memory 430 may be integrated into or embedded in the processor 100. Alternatively, the memory controller may be provided between the processor 100 and the memory 430.

The I/O ports 440 are ports that receive data transmitted to the data processing system 500 or transmit data from the data processing system 500 to an external device. For instance, the I/O ports 440 may include a port connecting with a pointing device such as a computer mouse, a port connecting with a printer, and a port connecting with a USB drive.

The expansion card 450 may be implemented as a secure digital (SD) card or a multimedia card (MMC). The expansion card 450 may be a subscriber identity module (SIM) card or a universal SIM (USIM) card.

The network device 460 enables the data processing system 500 to be connected with a wired or wireless network. The display 470 displays data output from the storage 420, the memory 430, the I/O ports 440, the expansion card 450, or the network device 460.

The camera module 480 may convert an optical image to an electronic image. Accordingly, the electronic image output from the camera module 480 may be stored in the storage 420, the memory 430, or the expansion card 450. And, the electronic image output from the camera module 480 may be displayed through the display 470.

The inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the inventive concepts can be easily construed by programmers.

As described above, according to some example embodiments, a host is allowed to access a key in a key manager only by a command and software is controlled not to directly access the key, so that the key is securely managed during the entire life cycle from key generation to key destruction.

While the inventive concepts have been particularly shown and described with reference to example embodiments thereof, it will be understood by those of ordinary skill in the art that various changes in forms and details may be made therein without departing from the spirit and scope of the inventive concepts as defined by the following claims.

What is claimed is:

1. A key manager comprising:
a main controller configured to process a command;
a decrypted key memory configured to store a first key;
an encrypted key memory configured to store an encrypted key; and
a cipher unit and a hash unit configured to,
encrypt the first key according to control of the main controller to form the encrypted key or encrypt data to form encrypted data based on a result of the main controller processing the command, the encrypting the first key including,
hashing a portion of the first key and a portion of a random number chosen based on a hash value to form a hashed key,
encrypting the hashed key and the hash value to form the encrypted key, and
storing the encrypted key in the encrypted key memory, and
decrypt the encrypted key or the encrypted data based on the result of the main controller processing the command.

2. The key manager of claim 1, wherein the main controller comprises:
a register configured to store the command; and
a processor configured to switch between a number of states within a finite state machine based on the command.

3. The key manager of claim 2, wherein the register comprises;
a command register configured to store the command; and
a status register configured to store status information associated with the command.

4. The key manager of claim 3, wherein the command includes a command type and an address, the address being an address of one of the first key in the decrypted key memory and the encrypted key in the encrypted key memory.

5. The key manager of claim 4, wherein the command includes one of a key generation command, a key encryption command, a key decryption command, a key load command, and a key destruction command.

6. The key manager of claim 1, wherein the first key is a key encryption key (KEK) configured to encrypt keys or a data encryption key (DEK) configured to encrypt data.

7. The key manager of claim 6, further comprising:
a one-time programmable (OTP) memory configured to generate the KEK; and
a random number generator configured to generate the DEK.

8. The key manager of claim 7, wherein the encrypted key comprises:
a first encrypted key part, a second encrypted key part and the hash value, the first encrypted key part including a first part of the first key and a first part of a random number generated by the random number generator and the second encrypted key part including a second part of the first key and a second part of the random number.

9. The key manager of claim 1, wherein the cipher unit comprises:
a key register configured to store the encrypted key;
an input data register configured to store data; and
an output data register configured to store one or more of encrypted data and decrypted data.

10. The key manager of claim 9, further comprising:
a debug mode module configured to allow a host to access the key register, the input data register and the output data register during a test mode.

11. The key manager of claim 10, wherein the debug mode module comprises:
a debug mode register including a test mode enable bit, a random number enable bit, and reserved bits; and
a debug mode enable logic unit configured to enable the test mode in response to the test mode enable bit and the random number enable bit.

12. The key manager of claim 1, wherein the cipher unit, the hash unit, the decrypted key memory, and the encrypted key memory are implemented in hardware.

13. The key manager of claim 1, wherein the main controller is configured to allow a host to read the encrypted key stored in the encrypted key memory and prevent the host from accessing the decrypted key memory, the cipher unit, and the hash unit.

14. A method of managing a first key, the method comprising: processing a command stored in a command register;
generating a first random number using a random number generator and storing the generated first random number as a decrypted key in a decrypted key memory, if the command is a key generation command; and
generating an encrypted key, if the command is a key encryption command, the generating the encrypted key including,
hashing a portion of the decrypted key and a portion of a second random number chosen based on a first hash value to form a hashed key,
encrypting the hashed key and the first hash value to form an encrypted key,
storing the encrypted key in an encrypted key memory, and
reading and outputting the encrypted key from the encrypted key memory.

15. The method of claim 14, wherein the command comprises:
a command type and an address of one of the encrypted key and decrypted key.

16. A key manager comprising:
a random number generator configured to generate a random number;
a memory configured to store a first key; and
a main controller configured to,
store the random number in an address of a decrypted key memory,
encrypt the first key by,
hashing a portion of the first key and a portion of the random number chosen based on a first hash value to form a hashed key,
encrypt the hashed key and the first hash value to form an encrypted key, and
store the encrypted key in an encrypted key memory,
decrypt an encrypted key received from an external host to form a decrypted key, and control communication with the external host such that, in a normal operation mode, the external host is allowed access to the encrypted key memory and is prevented from accessing the decrypted key memory.

17. The key manager of claim 16, wherein the main controller is configured to decrypt the encrypted key by,
    decrypting the encrypted key based on a first hash value and the random number to form a decrypted key; and
    performing an integrity check on the decrypted key, the performing the integrity check including,
        generating a second hash value based on the decrypted key, and
        comparing the generated second hash value to the first hash value of the decrypted key.

18. The key manager of claim 16, wherein, in a debug mode, the main controller is configured to allow the external host to access to the decrypted key memory.

* * * * *